(No Model.)

R. JOHNSTON & G. W. PEIFER, Jr.
BICYCLE.

No. 360,595. Patented Apr. 5, 1887.

WITNESSES:
Geo. Gunt
B. Morris

INVENTORS.
Robert Johnston
and Geo. W. Peifer, Jr.
BY
Herbert W. T. Jenner.
ATTORNEY

UNITED STATES PATENT OFFICE.

ROBERT JOHNSTON AND GEORGE W. PEIFER, JR., OF WILKES-BARRÉ, PA.

BICYCLE.

SPECIFICATION forming part of Letters Patent No. 360,595, dated April 5, 1887.

Application filed January 22, 1887. Serial No. 225,133. (No model.)

*To all whom it may concern:*

Be it known that we, ROBERT JOHNSTON and GEORGE W. PEIFER, Jr., citizens of the United States, residing at Wilkes-Barré, in the county of Luzerne and State of Pennsylvania, have invented certain new and useful Improvements in Bicycles; and we hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to those bicycles which have a small steering wheel in front; and it consists in the novel construction and combination of the parts, hereinafter fully described and claimed, for automatically steering the bicycle in a straight line.

Figure 1:
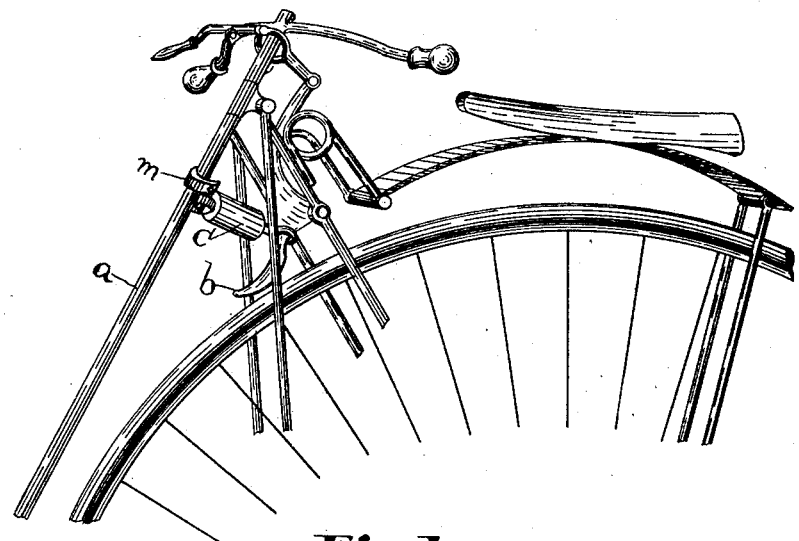
Figure 2:
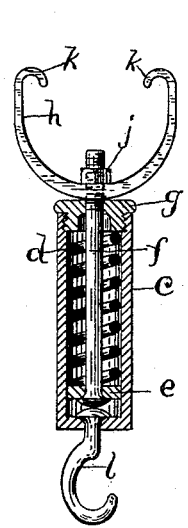
Figure 3:
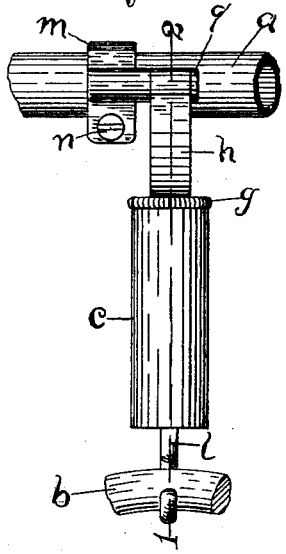
Figure 4:
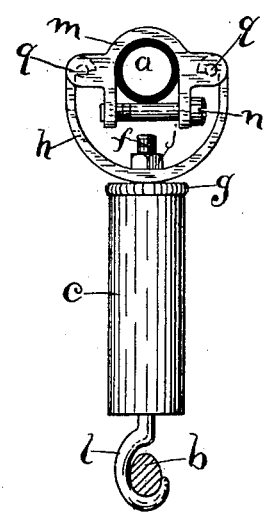

In the drawings, Figure 1 is a perspective view of the upper part of a bicycle provided with the self-steering attachment. Fig. 2 is a longitudinal section through the attachment, taken on line 1 2 in Fig. 3. Fig. 3 is a side view of the attachment. Fig. 4 is also a side view showing the attachment turned one-quarter round.

The bicycle shown is of the construction having a small steering-wheel in front.

$a$ is the steering-rod, and $b$ is the brake.

C is a small cylinder, provided with the hook $l$ at one end for attaching it to the brake.

A piston, $e$, works back and forth in the cylinder, and is provided with a piston-rod, $f$, having a screwed end which projects through a hole in the cap $g$, which is screwed into the end of the said cylinder. A spring, $d$, is arranged between the cap and the piston inside the cylinder and presses them apart. A yoke, $h$, having hooks $k$, is screwed upon the end of the piston-rod until the spring has been adjusted to the required pressure, and is held in position by the jam-nut $j$. A clamp, $m$, is securely fastened upon the steering-spindle by means of the screw $n$, and the said clamp has pins $q$ projecting from the sides of it for the hooks $k$ to couple onto.

The device is attached to the bicycle, as shown in Fig. 1, and when the spindle $a$ is turned, so as to cause the small wheel to steer to one side, the spring $d$ is compressed, and the pressure of the spring restores the small wheel to its central position when the handles are released. This spring also neutralizes the tendency of the little wheel to continue to turn when turned slightly in steering, and forms a convenient spring for keeping the brake off the large wheel.

What we claim is—

1. A self-steering attachment for a bicycle, consisting of a clamp for attachment to the steering-bar, in combination with a cylinder connected to the brake, and a spring-pressed piston working in the said cylinder and connected to the clamp, substantially as set forth.

2. A self-steering attachment for a bicycle, consisting of a clamp for attachment to the steering-bar, in combination with a cylinder connected to the brake, a piston, and a piston-rod working in the said cylinder, a spring pressing on the piston, and a yoke screwed on the end of the piston-rod for adjusting the pressure of the spring and connecting the piston-rod to the said clamp, substantially as set forth.

3. The combination of the cylinder C, the hook $l$, the screw-cap $g$, the piston and piston-rod working in the cylinder, the spring $d$, the yoke screwed on the piston-rod and having hooks $k$, the jam-nut $j$, and the clamp provided with a tightening-screw and pins with which the hooks of the yoke may engage, substantially as and for the purpose set forth.

In testimony whereof we affix our signatures in presence of two witnesses.

ROBT. JOHNSTON.
    GEO. W. PEIFER, JR.

Witnesses:
 NATHAN KRAUSE,
 J. E. GALER.